US011390212B2

(12) United States Patent
Chen et al.

(10) Patent No.: US 11,390,212 B2
(45) Date of Patent: Jul. 19, 2022

(54) METHOD AND APPARATUS FOR UNMANNED VEHICLE PASSING THROUGH INTERSECTION, DEVICE AND STORAGE MEDIUM

(71) Applicant: Baidu Online Network Technology (Beijing) Co., Ltd., Beijing (CN)

(72) Inventors: Youhan Chen, Beijing (CN); Ya Wang, Beijing (CN)

(73) Assignee: APOLLO INTELLIGENT DRIVING (BEIJING) TECHNOLOGY CO, Haidian District (CN)

( * ) Notice: Subject to any disclaimer, the term of this patent is extended or adjusted under 35 U.S.C. 154(b) by 257 days.

(21) Appl. No.: 16/516,068

(22) Filed: Jul. 18, 2019

(65) Prior Publication Data
US 2020/0079286 A1    Mar. 12, 2020

(30) Foreign Application Priority Data

Sep. 10, 2018   (CN) .......................... 201811049592.0

(51) Int. Cl.
*B60Q 5/00*    (2006.01)
*G05D 1/00*   (2006.01)
(Continued)

(52) U.S. Cl.
CPC ............. *B60Q 5/006* (2013.01); *B60Q 1/503* (2013.01); *B60R 11/0229* (2013.01);
(Continued)

(58) Field of Classification Search
CPC ..... B60Q 5/006; B60Q 1/503; B60R 11/0229; G05D 1/0088; G05D 1/0231; G05D 2201/0213
See application file for complete search history.

(56) References Cited

U.S. PATENT DOCUMENTS 9,196,164 B1    11/2015  Urmson et al.
9,221,396 B1    12/2015  Zhu et al.
(Continued)

FOREIGN PATENT DOCUMENTS

CN     103383265 A    11/2013
CN     104494598 A     4/2015
(Continued)

OTHER PUBLICATIONS

European Patent Office, European Search Report regarding 19180886.4-1203 dated Jan. 3, 2020; 4 pages.
(Continued)

*Primary Examiner* — Hussein Elchanti
(74) *Attorney, Agent, or Firm* — Tucker Ellis LLP

(57) ABSTRACT

Embodiments of the present application provide a method and an apparatus for an unmanned vehicle passing through an intersection, a device and a storage medium. The method includes: detecting whether the unmanned vehicle is at an intersection without a traffic light sign; identifying a moving direction and a distance of outside personnel and/or identifying voice and limb reaction of the outside personnel when determining that the unmanned vehicle is at the intersection without the traffic light sign; determining whether to pass according to the moving direction and the distance of the outside personnel, and/or the voice and limb reaction of the outside personnel; and making a corresponding voice prompt and/or a corresponding visual prompt to the outside personnel according to a result of the determination on whether to pass.

18 Claims, 4 Drawing Sheets

(51) Int. Cl.
    *G05D 1/02*     (2020.01)
    *B60R 11/02*     (2006.01)
    *B60Q 1/50*     (2006.01)

(52) U.S. Cl.
    CPC ......... *G05D 1/0088* (2013.01); *G05D 1/0231* (2013.01); *G05D 2201/0213* (2013.01)

(56) References Cited

U.S. PATENT DOCUMENTS

| | | | |
|---|---|---|---|
| 2014/0374478 A1* | 12/2014 | Dearing | B07C 3/18 |
| | | | 235/385 |
| 2017/0010679 A1 | 1/2017 | Hillis et al. | |
| 2017/0032197 A1 | 2/2017 | Sim | |
| 2018/0075747 A1* | 3/2018 | Pahwa | B60W 30/0956 |
| 2018/0326982 A1* | 11/2018 | Paris | G05D 1/0088 |
| 2019/0061764 A1* | 2/2019 | Tokuhiro | B60W 50/14 |
| 2019/0225217 A1* | 7/2019 | Tsukada | B60W 60/0053 |
| 2020/0031337 A1* | 1/2020 | Soltanian | B60W 30/0956 |
| 2020/0242922 A1* | 7/2020 | Dulberg | G08G 1/164 |
| 2020/0250473 A1* | 8/2020 | Elluswamy | G16Y 20/10 |

FOREIGN PATENT DOCUMENTS

| | | |
|---|---|---|
| CN | 107176161 A | 9/2017 |
| CN | 107226089 A | 10/2017 |
| JP | 2015186944 A | 10/2015 |
| JP | 2017-0764 A | 4/2017 |
| JP | 2017-076432 A | 4/2017 |
| JP | 2017207932 A | 11/2017 |
| WO | 2017056995 A1 | 4/2017 |
| WO | 2017146815 A1 | 8/2017 |

OTHER PUBLICATIONS

First Office Action of the priority No. 201811049592.0 dated Nov. 29, 2019; 9 pages.
First Office Action of Parallel JP Application No. 2019-125684 dated Sep. 14, 2020; 7 pages.

* cited by examiner

METHOD AND APPARATUS FOR UNMANNED VEHICLE PASSING THROUGH INTERSECTION, DEVICE AND STORAGE MEDIUM

CROSS-REFERENCE TO RELATED APPLICATION

This application claims priority to Chinese Patent Application No. 201811049592.0, filed on Sep. 10, 2018, which is hereby incorporated by reference in its entirety.

TECHNICAL FIELD

Embodiments of the present application relate to the field of unmanned driving technology, and in particular, to a method and an apparatus for an unmanned vehicle passing through an intersection, a device and a storage medium.

BACKGROUND

With the development of Internet and economy, unmanned driving technology has achieved rapid development to meet people's travel requirements. An unmanned driving vehicle is a type of smart car, which is also known as a wheeled mobile robot. The unmanned driving vehicle mainly depends on a computer-based smart pilot in the car to achieve the purpose of unmanned driving.

In the prior art, when a common vehicle encounters a pedestrian, a bicycle or another vehicle at an intersection without a traffic light, in order to improve safety, the driver timely controls the vehicle or communicates with the pedestrian, the cyclist or the driver of the vehicle with eyes, gestures or language to ensure the safety at the intersection without the traffic light.

However, in the existing unmanned vehicle without a driver, when encountering a pedestrian, a cyclist or another vehicle at an intersection without a traffic light, the unmanned vehicle cannot communicate with them and cannot effectively avoid the pedestrian, the cyclist or the vehicle, which is easy to cause traffic accidents.

SUMMARY

Embodiments of the present application provide a method and an apparatus for an unmanned vehicle passing through an intersection, a device and storage medium, which solve the technical problem that, in the prior art, when encountering a pedestrian, a cyclist or another vehicle at an intersection without a traffic light, the unmanned vehicle without a driver cannot communicate with them and cannot effectively avoid the pedestrian, the cyclist or the vehicle, which is easy to cause traffic accidents.

A first aspect of the embodiment of the present application provides a method for an unmanned vehicle passing through an intersection, including: detecting whether the unmanned vehicle is at an intersection without a traffic light sign; identifying a moving direction and a distance of outside personnel and/or identifying voice and limb reaction of the outside personnel when determining that the unmanned vehicle is at the intersection without the traffic light sign; determining whether to pass according to the moving direction and the distance of the outside personnel, and/or the voice and limb reaction of the outside personnel; and making a corresponding voice prompt and/or a corresponding visual prompt to the outside personnel according to a result of the determination on whether to pass.

A second aspect of the embodiment of the present application provides an apparatus for an unmanned vehicle passing through an intersection, including: a detection module, configured to detect whether the unmanned vehicle is at an intersection without a traffic light sign; an identification module, configured to identify a moving direction and a distance of the outside personnel and/or identifying voice and limb reaction of the outside personnel when determining that the unmanned vehicle is at the intersection without the traffic light sign; a passing determination module, configured to determine whether to pass according to the moving direction and the distance of the outside personnel, and/or the voice and limb reaction of the outside personnel; and a prompt module, configured to make a corresponding voice prompt and/or a visual prompt to the outside personnel according to a result of the determination on whether to pass.

A third aspect of the embodiment of the present application provides a terminal device which is disposed on an unmanned vehicle, the terminal device including: one or more processors; a storage apparatus, configured to store one or more programs; a video image collection apparatus, configured to collect a video or image data of a road and videos or image data of the outside personnel; a voice collection apparatus, configured to collect voice data of the outside personnel; the one or more programs, when executed by the one or more processors, cause the one or more processors to implement the method of the first aspect.

A fourth aspect of the embodiment of the present application provides a computer readable storage medium having a computer program stored thereon, and the program is executed by a processor to implement the method of the above first aspect.

Based on each of the above aspects, the embodiments of the present application detect whether the unmanned vehicle is at an intersection without a traffic light sign; identify a moving direction and a distance of the outside personnel and/or identify voice and limb reaction of the outside personnel when determining that the unmanned vehicle is at the intersection without the traffic light sign; determine whether to pass according to the moving direction and the distance of the outside personnel, and/or the voice and limb reaction of the outside personnel; and make a corresponding voice prompt and/or a corresponding visual prompt to the outside personnel according to a result of the determination on whether to pass. Since the unmanned vehicle can obtain information from the outside personnel at the intersection without traffic lights, and make voice and/or visual prompts of giving way or going first for the outside personnel according to the information of the outside personnel, the unmanned vehicle can communicate with the outside personnel, thereby avoiding pedestrians, cyclists or other vehicles effectively and avoiding traffic accidents effectively.

It should be understood that the content described in the above the summary is not intended to limit the critical or important features of the embodiments of the present application, nor is it intended to limit the scope of the present application. Other features of the present application will be easily understood by the following description.

DESCRIPTION OF EMBODIMENTS

Figure 1:
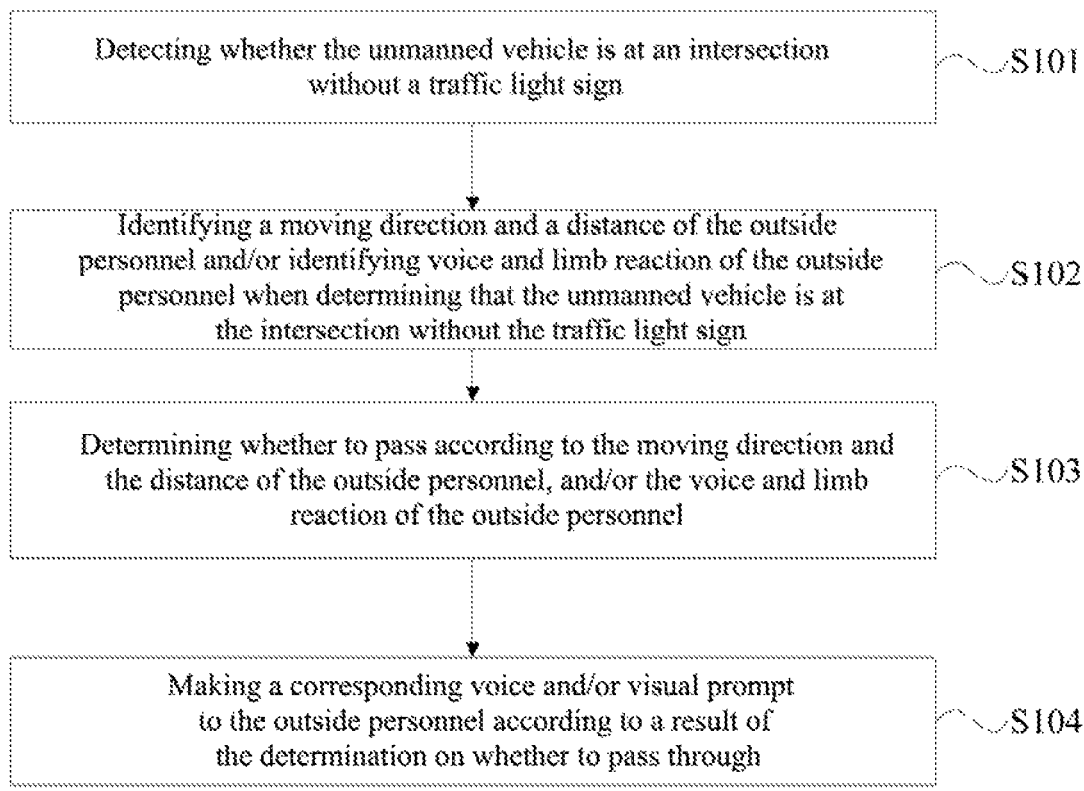
FIG. 1 is a flowchart of a method for an unmanned vehicle passing through an intersection provided by Embodiment 1 of the present application.

Embodiments of the present application will be described in more detail below with reference to the accompanying drawings. Although some embodiments of the present application are shown in the accompanying drawings, it should be understood that the present application can be implemented in a variety of forms and should not be construed as being limited to the embodiments set forth herein. The embodiments are provided for a more through and complete understanding of the present application. It should be understood that the accompanying drawings and the embodiments of the present application are intended to be illustrative only and not to limit the protection scope of the present application.

The terms "first", "second", "third", "fourth" and the like (if present) in the description of the embodiments of the present application, claims and the above accompanying drawings are used to distinguish similar objects, and are not necessarily used to describe a particular order or sequence. It should be understood that the data used in this way may be interchanged as appropriate, so that the embodiments of the present application described herein may be implemented, for example, in a sequence other than those illustrated or described herein. In addition, the terms "comprise", and "include" and any variations thereof are intended to cover a non-exclusive inclusion, for example, a process, a method, an system, a product or a device that comprises a series of steps or units is not necessarily limited to those steps or units clearly listed, but may include other steps or units that are not explicitly listed or that are inherent to such a process, a method, a product or a device.

In order to clearly understand the technical solution of the present application, the term involved in the present application are explained below.

Unmanned driving vehicle: an unmanned driving vehicle is a smart car that senses road environment through an in-vehicle sensing system, automatically plans a driving route and controls the vehicle to reach a preset target. It uses in-vehicle sensors to sense surrounding environment of the vehicle and obtains information of a road, a vehicle location and an obstacle according to perception, and controls the steering and speed of the vehicle, so that the vehicle can travel safely and reliably on the road. It integrates many technologies such as automatic control, architecture, artificial intelligence, visual computing, etc. It is a product of a high development of computer science, pattern recognition and intelligent control technologies. It is also an important indicator to measure the scientific research strength and industrial level of a country. And it has broad application prospects in the fields of national defense and national economy. The unmanned driving vehicle is referred to as an unmanned vehicle in the embodiments of the present application.

The embodiments of the present application will be described below in detail with reference to the accompanying drawings.

Embodiment 1

FIG. 1 is a flowchart of a method for an unmanned vehicle passing through an intersection provided by Embodiment 1 of the present application. As shown in FIG. 1, the executive body of the embodiment of the present application is an apparatus for the unmanned vehicle passing through the intersection, which may be integrated in a terminal device. And the terminal device may be an in-vehicle terminal device. The method for an unmanned vehicle passing through an intersection provided by Embodiment 1 includes the following steps.

Step 101: detecting whether the unmanned vehicle is at an intersection without a traffic light sign.

In the embodiment, the unmanned vehicle has a plurality of types of sensors, including at least an outward-facing camera and a voice sensor.

Specifically, in the embodiment, first, whether the unmanned vehicle is at an intersection may be determined according to a video or image data of a road collected by the outward-facing camera. When the unmanned vehicle is at the intersection, a traffic sign may be recognized using a traffic sign recognition algorithm according to the video or image data of the road, and whether there is a traffic light sign at the intersection is determined.

The intersection may be a crossroad, a fork intersection, etc., which is not limited in the embodiment.

Step 102: identifying a moving direction and a distance of the outside personnel and/or identifying voice and limb reaction of the outside personnel when determining that the unmanned vehicle is at the intersection without the traffic light sign.

Specifically, in the embodiment, when it is determined that the unmanned vehicle is at the intersection without the traffic light sign, the moving direction and distance of the outside personnel may be identified according to a video or image data of other personnel captured by an outward-facing camera. Or, as an alternative solution, limb reaction of the outside personnel may be recognized according to the video or image data of the outside personnel collected by the outward-facing camera, and voice reaction of the outside personnel may be recognized according to the voice data of the outside personnel collected by an outward-facing voice sensor. Or, not only may the moving direction and the distance of the outside personnel be recognized according to the video or image data of the outside personnel captured by the outward-facing camera, but also the limb reaction of the outside personnel may be recognized according to the video or image data of the outside personnel collected by the outward-facing camera and the voice reaction of the outside personnel may be recognized according to the voice data of the outside personnel collected by the outward-facing voice sensor.

The outside personnel may be a pedestrian, a bicycle or a driver of another vehicle.

The limb reaction of the outside personnel may be a gesture reaction, such as a "stop moving forward" gesture, a "give way" gesture, etc. The voice reaction of the outside personnel may be a voice reaction indicating they going first such as "wait a minute" and "please give way" and may also be a voice reaction indicating they giving way such as "you go first" and "go ahead".

Step 103, determining whether to pass according to the moving direction and the distance of the outside personnel, and/or the voice and limb reaction of the outside personnel.

Specifically, in the embodiment, whether to pass may be determined according to the moving direction and the distance of the outside personnel, or whether to pass may be determined according to the voice reaction, the limb reaction, or the voice and limb reaction of the outside personnel. Or, whether to pass is determined according to the moving direction and the distance of the outside personnel, and the voice reaction, the limb reaction, or the voice and limb reaction of the outside personnel.

In the embodiment, an exemplary illustration is made as to determining whether to pass according to the moving direction and the distance of the outside personnel. The unmanned vehicle is determined to pass when the moving direction of the outside personnel is the same as that of the unmanned vehicle and the distance is within a preset safety distance; the unmanned vehicle is determined not to pass when the moving direction of the outside personnel is different from that of the unmanned vehicle and the distance is within a preset dangerous distance. The vehicle is stopped when the moving direction of the outside personnel is the same as that of the unmanned vehicle and the distance is within a preset dangerous distance, and the unmanned vehicle is started and passes when the distance is within a preset safety distance. The unmanned vehicle slows down and passes safely when the moving direction of the outside personnel is in a direction different from that of the unmanned vehicle and the distance is within a preset safety distance.

The preset safety distance may be 3 m, 5 m, etc., and the preset dangerous distance is 2 m, 1 m, etc. The specific values are not limited in the embodiment.

In the embodiment, an exemplary illustration is made as to determining whether to pass according to the voice and limb reaction of the outside personnel. The unmanned vehicle is determined not to pass when the voice and limb reaction of the outside personnel is reaction indicating "please let me go first", and the unmanned vehicle will pass after the outside personnel passing and being in a preset safety distance with the unmanned vehicle. The unmanned vehicle is determined to pass when the voice and limb reaction of the outside personnel is reaction indicating "giving way to the unmanned vehicle", and the preset safety distance is maintained with the outside personnel during passing through and the unmanned vehicle passes through the intersection safely.

Step 104: making a corresponding voice prompt and/or a corresponding visual prompt to the outside personnel according to a result of the determination on whether to pass.

Specifically, in the embodiment, a voice prompt and/or a visual prompt of giving way is made to the outside personnel when the result of determination on whether to pass is to pass; and a voice prompt and/or a visual prompt of going first is made to the outside personnel when the result of determination on whether to pass is not to pass.

The voice prompt may be made to outside through a microphone, and the visual prompt may be made by displaying an animation or a text prompt on an outward-facing display screen and/or lighting up a light on a body of the unmanned vehicle.

The method for an unmanned vehicle passing through an intersection provided by the embodiment is to detect whether the unmanned vehicle is at an intersection without a traffic light sign, identify a moving direction and a distance of the outside personnel and/or identifies voice and limb reaction of the outside personnel when determining that the unmanned vehicle is at the intersection without the traffic light sign, determine whether to pass according to the moving direction and the distance of the outside personnel and/or the voice and limb reaction of the outside personnel, and make a corresponding voice prompt and/or a corresponding visual prompt to the outside personnel according to a result of the determination on whether to pass. Since the unmanned vehicle may obtain information from the outside personnel at the intersection without traffic lights, and make a voice prompt and/or a visual prompt of giving way or going first to the outside personnel according to the information of the outside personnel, the unmanned vehicle can communicate with the outside personnel, thereby avoiding pedestrians, cyclists or other vehicles effectively and avoiding traffic accidents effectively.

Embodiment 2

Figure 2:
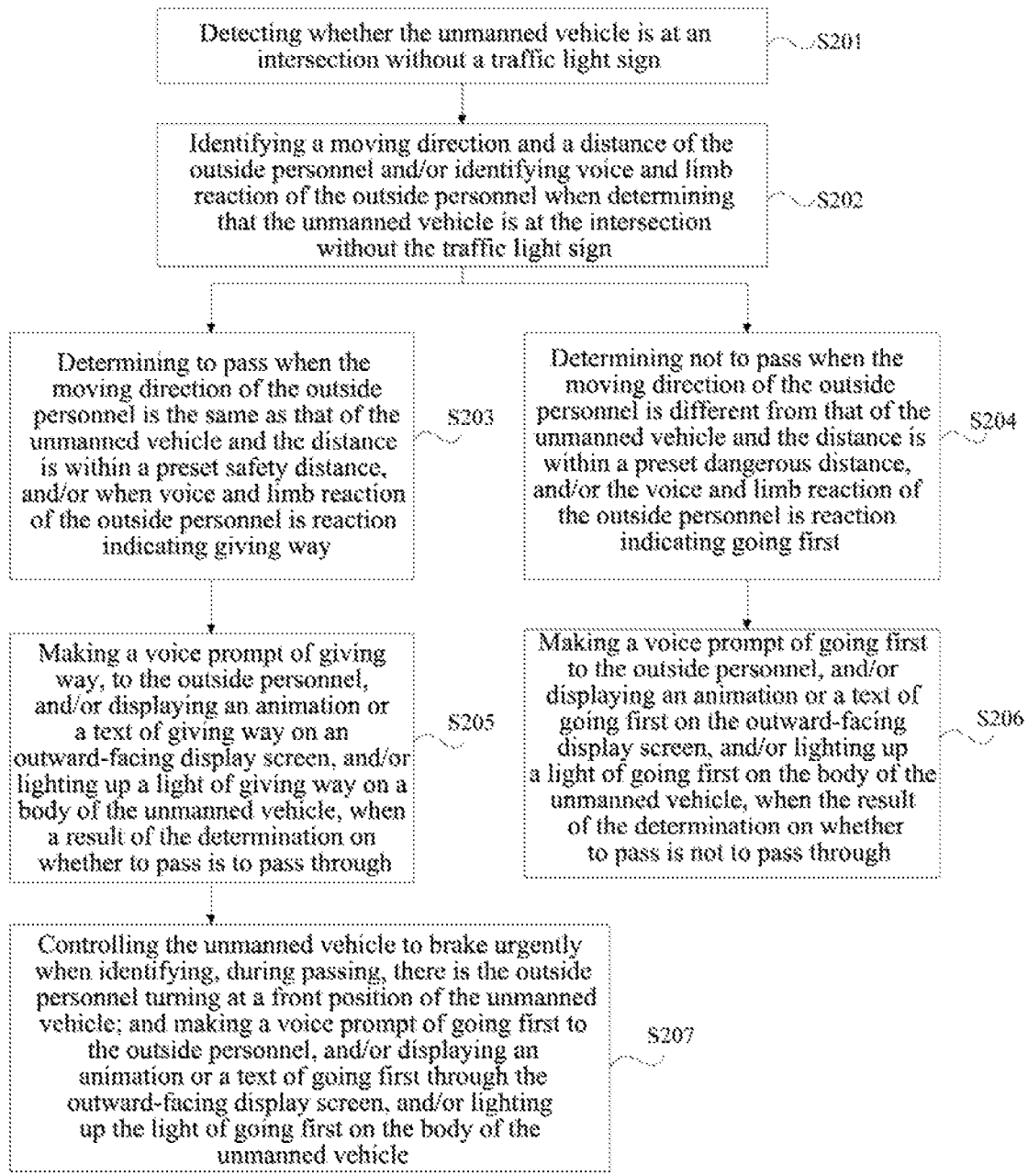
FIG. 2 is a flowchart of a method for an unmanned vehicle passing through an intersection provided by Embodiment 2 of the present application.

FIG. 2 is a flowchart of a method for an unmanned vehicle passing through an intersection provided by Embodiment 2 of the present application. As shown in FIG. 2, the method for an unmanned vehicle passing through an intersection provided by the embodiment further refines step 101 to step 104 based on the method for an unmanned vehicle passing through an intersection provided by the Embodiment 1 of the present application, and the method further includes the step of controlling the unmanned vehicle to brake urgently when identifying, during passing, the outside personnel turning at a front position of the unmanned vehicle. Then the method for an unmanned vehicle passing through an intersection provided by the embodiment includes the following steps.

Step 201: detecting whether the unmanned vehicle is at an intersection without a traffic light sign.

Further, in the embodiment, detecting whether the unmanned vehicle is at an intersection without a traffic light sign includes:

First, obtaining a video or image data of a road collected by a first outward-facing camera.

Specifically, the first outward-facing camera may be disposed on the unmanned vehicle, or may be disposed on the sides of the road. The first outward-facing camera communicates with the unmanned vehicle to transmit the video or image data of the road to the unmanned vehicle when it is disposed on the sides of the road.

Second, detecting whether the unmanned vehicle is at an intersection without a traffic light sign according to the video or the image data of the road.

Specifically, in the embodiment, it is first determined whether the unmanned vehicle is at the road intersection according to a feature of the intersection using an recognition algorithm, and when the unmanned vehicle is at the road intersection, it is further determined whether the unmanned vehicle is at the intersection without the traffic light sign according to a feature of the traffic light sign using the recognition algorithm.

The type of the recognition algorithm for determining whether the unmanned vehicle is at a road intersection and the type of the recognition algorithm for determining whether the intersection has a traffic light sign are not judged. The recognition algorithm may be, for example, a machine learning algorithm, a deep learning algorithm, etc.

Step 202: identifying a moving direction and a distance of the outside personnel and/or identifying voice and limb reaction of the outside personnel when determining that the unmanned vehicle is at the intersection without the traffic light sign.

Further, in the embodiment, the outside personnel is a pedestrian, a cyclist or a driver in another vehicle.

Further, in the embodiment, identifying a moving direction and a distance of the outside personnel, including:

First, obtaining videos or image data of the outside personnel collected by a plurality of second outward-facing cameras.

Specifically, in the embodiment, the second outward-facing cameras are disposed in each direction of the unmanned vehicle along the vehicle body, and the second outward-facing cameras are used to collect the videos or image data of the outside personnel. Since each of the second cameras is disposed in each direction of the unmanned vehicle, the collected videos or image data of the outside personnel have overlapping portions.

Second, identifying the moving direction and distance of the outside personnel according to the videos or the image data of the outside personnel.

Specifically, in the embodiment, the videos or image data of the outside personnel collected by the plurality of second outward-facing cameras have overlapping portions. Therefore, the moving direction and the distance of the outside personnel may be calculated according to the videos or image data collected by the plurality of second outward-facing cameras and the position data of each of the second outward-facing cameras.

Further, in the embodiment, the identifying voice and limb reaction of the outside personnel, including:

First, obtaining videos or image data of the outside personnel collected by the plurality of second outward-facing cameras.

Second, identifying limb reaction of the outside personnel according to the videos or image data of the outside personnel.

Specifically, in the embodiment, each of the second cameras is capable of obtaining a video or image data of the outside personnel in a corresponding orientation. The plurality of second cameras are outward-facing arranged in various directions along the body of the vehicle. They may collect videos or image data of all of other personnel outside the unmanned vehicle, perform limb recognition on all videos or image data through a limb recognition algorithm, and may identify the limb reaction of each personnel outside.

Preferably, in the embodiment, the limb recognition is a gesture recognition, and the limb reaction is a gesture reaction. Gesture reaction may be a "stop moving forward" gesture, a "give way" gesture or a "go first" gesture, etc.

Third, obtaining voice data of the outside personnel collected by a voice sensor.

At last, identifying voice reaction of the outside personnel according to the voice data and the videos or image data of the outside personnel.

Specifically, in the embodiment, the voice sensor may be set on the unmanned vehicle, the collected voice data of the outside personnel is obtained by the voice sensor, an approximate orientation and a moving direction of each voice may be obtained according to the volume of each voice collected by the voice sensor, specific orientation and moving direction of the outside personnel corresponding to each voice are determined according to the videos or image data of the outside personnel, and the voice reaction of each of the outside personnel is determined by combining the voice sensor data and the videos or image data.

The voice reaction may be voice reaction indicating going first, and may also be voice reaction indicating giving way.

Step 203: determining to pass when the moving direction of the outside personnel is the same as that of the unmanned vehicle and the distance is within a preset safety distance, and/or the voice and limb reaction of the outside personnel is reaction indicating giving way.

Step 204: determining not to pass when the moving direction of the outside personnel is different from that of the unmanned vehicle and the distance is within a preset dangerous distance, and/or the voice and limb reaction of the outside personnel is reaction indicating going first.

It should be illustrated that in the embodiment, step 203 and step 204 further refine step 103 of the method for an unmanned vehicle passing through an intersection provided by the Embodiment 1 of the present application.

Further, the description will be made in conjunction with step 203 to step 204. In the embodiment, when it is determined, according to the moving direction and the distance of the outside personnel, that the moving direction of the outside personnel is the same as that of the unmanned vehicle and the distance is within a preset safety distance, it means that the traffic is safe at this time and then it is determined to pass. And/or, when it is determined, according to the voice and limb reaction of the outside personnel, that the voice and limb reaction is reaction indicating giving way, it means that the traffic is safe at this time and then it is determined to pass. When it is determined, according to the moving direction and the distance of the outside personnel, that the moving direction of the outside personnel is different from that of the unmanned vehicle and the distance is within a preset dangerous distance, it means that the traffic is not safe at this time and then is determined to give way. And/or, when it is determined, according to the voice and limb reaction of the outside personnel, the voice and limb reaction is reaction indicating going first, it means that the traffic is not safe at this time and then it is determined not to pass through.

It can be understood that when the moving direction of the outside personnel is different from that of the unmanned vehicle and the distance is within a preset safety distance, and when the speed is slowed down, the unmanned vehicle can also pass safely, then it is determined to pass slowly. When the moving direction of the outside personnel is the same as that of the unmanned vehicle and the distance is within a preset dangerous distance, then it is determined not to pass until the distance reaches the preset safety distance. When the outside personnel have not moved and the distance is within a preset safety distance, it is determined to pass.

Step 205: making a voice prompt of giving way to the outside personnel, and/or displaying an animation or a text of giving way on an outward-facing display screen, and/or lighting up a light of giving way on the body of the unmanned vehicle when the result of the determination on whether to pass is to pass.

Step 206: making a voice prompt of going first to the outside personnel, and/or displaying an animation or a text of going first on an outward-facing display screen, and/or lighting up a light of going first on the body of the unmanned vehicle when the result of the determination on whether to pass is not to pass.

It should be illustrated that in the embodiment, step 205 and step 206 further refine step 104 of the method for an unmanned vehicle passing through an intersection provided by Embodiment 1 of the present application.

Further, in the embodiment, when the result of the determination on whether to pass is to pass, in order to attract the attention of the outside personnel, when the unmanned vehicle passes, a voice prompt of giving way is made to the outside personnel, and/or an animation or a text of giving way is displayed on an outward-facing display screen and/or a light of giving way is lighten up on the body of the unmanned vehicle. When the result of the determination on whether to pass is not to pass, in order to let the outside personnel know that the outside personnel can go first and rest assured to pass through, a voice prompt of going first is made to the outside personnel, and/or an animation or a text of going first is displayed on an outward-facing display screen, and/or a light of going first is lighten up on the body of the unmanned vehicle.

The light of giving way and the light of going first on the body of the unmanned vehicle are defined in advance, and the outside personnel has known in advance.

Preferably, in the embodiment, the outward-facing display screen is disposed on a window glass. When the unmanned vehicle interacts with the outside personnel through the outward-facing display screen, the window glass is controlled to become the outward-facing display screen. When the unmanned vehicle does not interact with the outside personnel, the window glass is controlled to show an outside panoramic view.

Specifically, in the present embodiment, since there is no driver in the unmanned vehicle, in order to achieve the maximum utilization of the window, the outward-facing display screen is disposed on the window glass. The window glass is made of special materials. The window glass can be controlled to become the outward-facing display screen when the unmanned vehicle interacts with the outside personnel through the outward-facing display screen. When the unmanned vehicle does not interact with other outsiders, the window glass is controlled to show an outside panoramic view.

It should be noted that step 207 is performed after step 205.

Step 207: controlling the unmanned vehicle to brake urgently when identifying that the outside personnel turns at a front position of the unmanned vehicle, during the unmanned vehicle passing through; and making a voice prompt of going first to the outside personnel and/or displaying an animation or a text of going first on an outward-facing display screen and/or lighting up a light of going first on the body of the unmanned vehicle.

Further, in the embodiment, after the unmanned vehicle makes a prompt of giving way to the outside personnel, it may still encounter one or more outside personnel passing through the intersection instead of giving way. In the process of the unmanned vehicle passing, it is identified whether the outside personnel turns at the front position of the unmanned vehicle. When it is identified that there is the outside personnel turning at a front position of the unmanned vehicle during the unmanned vehicle passing through the intersection, the unmanned vehicle is controlled to brake urgently, so that the outside personnel turning can pass safely. And in order to make the outside personnel who is turning to rest assured to pass, a voice prompt of going first is made to the outside personnel, and/or an animation or a text of going first is displayed on an outward-facing display screen, and/or a light of going first is lighten up on the body of the unmanned vehicle.

A method for an unmanned vehicle passing through an intersection provided by the embodiment, including: detecting whether the unmanned vehicle is at an intersection without a traffic light sign; identifying a moving direction and a distance of the outside personnel and/or identifying voice and limb reaction of the outside personnel when determining that the unmanned vehicle is at the intersection without the traffic light sign; determining to pass when the moving direction of the outside personnel is the same as that of the unmanned vehicle and the distance is within a preset safety distance, and/or when the voice and limb reaction is reaction indicating giving way; determining not to pass when the moving direction of the outside personnel is different from that of the unmanned vehicle and the distance is within a preset dangerous distance, and/or when the voice and limb reaction is reaction indicating going first; making a voice prompt of giving way to the outside personnel and/or displaying an animation or a text of giving way on an outward-facing display screen and/or lighting up a light of giving way on the body of the unmanned vehicle when the result of the determination on whether to pass is to pass, and making a voice prompt of going first to the outside personnel and/or displaying an animation or a text of going first on an outward-facing display screen and/or lighting up a light of going first on the body of the unmanned vehicle when the result of the determination on whether to pass is not to pass; and controlling the unmanned vehicle to brake urgently when identifying that there is the outside personnel turning at a front position of the unmanned vehicle during passing, and making a voice prompt of going first to the outside personnel and/or displaying an animation or a text of going first on an outward-facing display screen and/or lighting up a light of going first on the body of the unmanned vehicle. The unmanned vehicle can not only communicates with the outside personnel to effectively avoid pedestrians, cyclists or other vehicles and effectively avoid traffic accidents, but also can brake urgently and alert the outside personnel when encountering emergency situations during passing, thereby further improving safety during passing.

Embodiment 3

Figure 3:
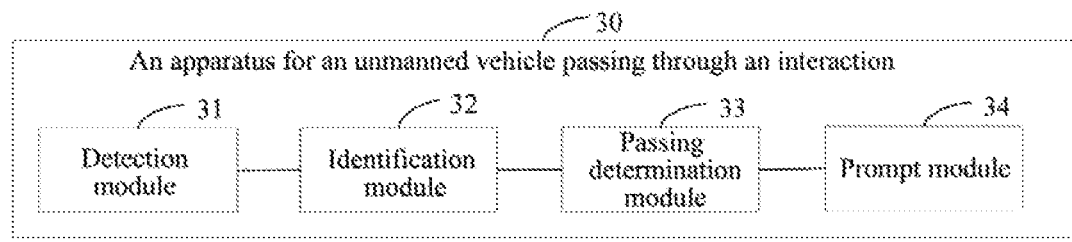
FIG. 3 is a schematic structural diagram of an apparatus for an unmanned vehicle passing through an intersection provided by Embodiment 3 of the present application.

FIG. 3 is a schematic structural diagram of an apparatus for an unmanned vehicle passing through an intersection provided by Embodiment 3 of the present application. As shown in FIG. 3, the apparatus 30 for an unmanned vehicle passing through an intersection provided by the embodiment includes: a detection module 31, an identification module 32, a passing determination module 33 and a prompt module 34.

The detection module 31 is configured to detect whether the unmanned vehicle is at an intersection without a traffic light sign. The identification module 32 is configured to identify a moving direction and a distance of the outside personnel and/or identifying voice and limb reaction of the outside personnel when determining that the unmanned vehicle is at the intersection without the traffic light sign. The passing determination module 33 is configured to determine whether to pass according to the moving direction and the distance of the outside personnel, and/or the voice and limb reaction of the outside personnel. The prompt module 34 is configured to make a corresponding voice prompt and/or a corresponding visual prompt to the outside personnel according to a result of the determination on whether to pass.

The apparatus for an unmanned vehicle passing through an intersection provided by the embodiment can perform the technical solution of the method embodiment shown in FIG.

1, and the implementation principle and technical effect thereof are similar, which will not be described herein again.

Embodiment 4

Figure 4:
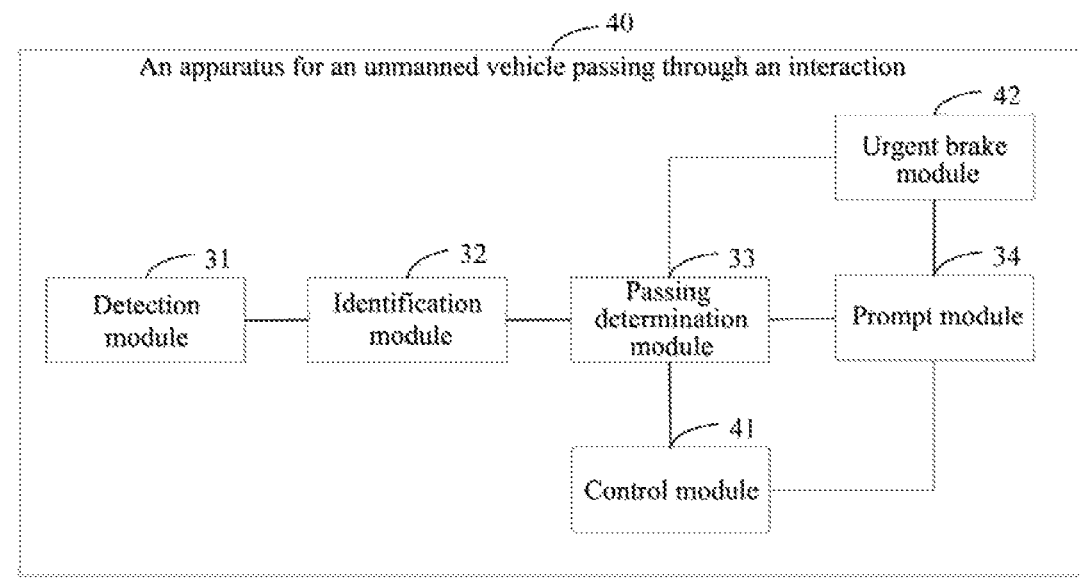
FIG. 4 is a schematic structural diagram of an apparatus for an unmanned vehicle passing through an intersection provided by Embodiment 4 of the present application.

FIG. 4 is a schematic structural diagram of an apparatus for an unmanned vehicle passing through an intersection provided by Embodiment 4 of the present application. As shown in FIG. 4, the apparatus 40 for an unmanned vehicle passing through an intersection provided by the embodiment, on the basis of the apparatus for the unmanned vehicle passing through an intersection provided by Embodiment 3 of the present application, further includes: a control module 41 and an urgent brake module 42.

Further, the prompt module 34 is specifically configured to:

make a voice prompt of giving way to the outside personnel, and/or display an animation or a text of giving way on an outward-facing display screen, and/or light up a light of giving way on the body of the unmanned vehicle when the result of determination on whether to pass is to pass through; and make a voice prompt of going first to the outside personnel and/or display an animation or a text of going first on an outward-facing display screen and/or light up a light of going first on the body of the unmanned vehicle when the result of the determination on whether to pass is not to pass.

Further, the outward-facing display screen is disposed on a window glass. The control module 41 is configured to control the window glass to become the outward-facing display screen when the unmanned vehicle interacts with the outside personnel through the outward-facing display screen, and control the window glass to show an outside panoramic view when the unmanned vehicle does not interact with the outside personnel.

Further, the detection module 31 is specifically configured to: obtain a video or image data of a road collected by a first outward-facing camera; and detect whether the unmanned vehicle is at the intersection without the traffic light sign according to the video or the image data of the road.

Further, the identification module 32 is specifically configured to:

obtain videos or image data of the outside personnel collected by a plurality of second outward-facing cameras; and identify the moving direction and the distance of the outside personnel according to the videos or image data of the outside personnel.

Further, the identification module 32 is specifically configured to:

obtain videos or image data of the outside personnel collected by the plurality of second outward-facing cameras; and identify limb reaction of the outside personnel according to the videos or the image data of the outside personnel; obtain voice data of the outside personnel collected by a voice sensor; and identify voice reaction of the outside personnel according to the voice data and the videos or image data of the outside personnel.

Further, the passing determination module 33 is specifically configured to:

determine to pass when the moving direction of the outside personnel is the same as that of the unmanned vehicle and the distance is within a preset safety distance, and/or when the voice and limb reaction of the outside personnel is reaction indicating giving way; and determine not to pass when the moving direction of the outside personnel is different from that of the unmanned vehicle and the distance is within a preset dangerous distance, and/or when the voice and limb reaction of the outside personnel is reaction indicating going first.

Further, the urgent brake module 42 is configured to control the unmanned vehicle to brake urgently when identifying that there is the outside personnel turning at a front position of the unmanned vehicle during the unmanned vehicle passing. The prompt module 34 is further configured to make a voice prompt of going first to the outside personnel and/or display an animation or a text of going first on an outward-facing display screen and/or light up a light of going first on the body of the unmanned vehicle.

The apparatus for an unmanned vehicle passing through an intersection provided by the embodiment can perform the technical solution of the method embodiment shown in FIG. 2, and the implementation principle and technical effect thereof are similar, which will not be described herein again.

Embodiment 5

Figure 5:
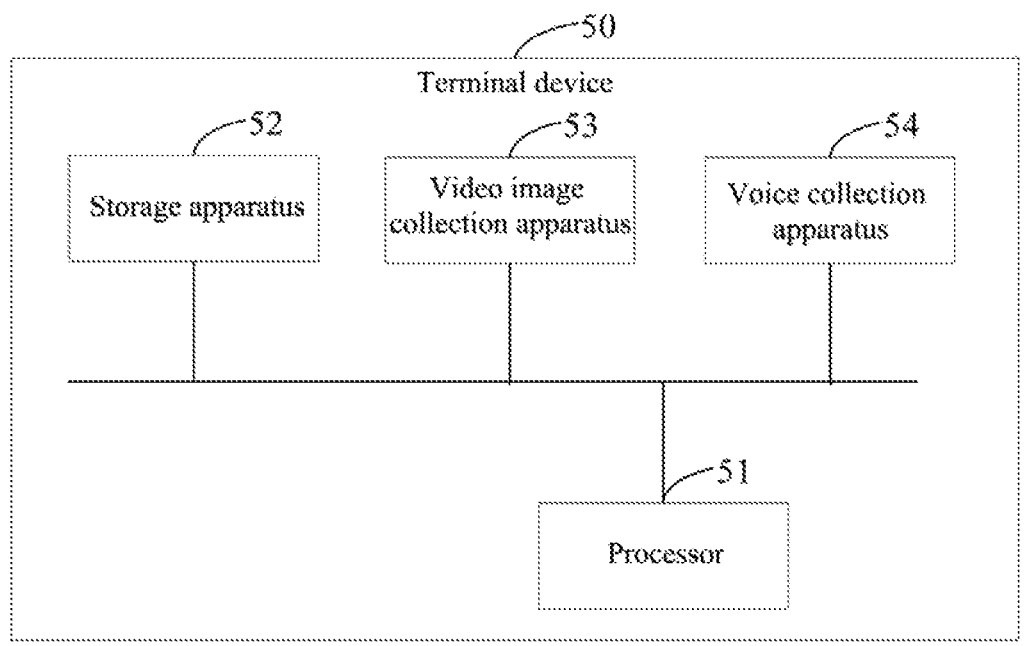
FIG. 5 is a schematic structural diagram of a terminal device provided by Embodiment 5 of the present application.

FIG. 5 is a schematic structural diagram of a terminal device provided by Embodiment 5 of the present application. As shown in FIG. 5, the terminal device 50 provided by the embodiment is disposed on an unmanned vehicle and includes: one or more processors 51, a storage apparatus 52, a video image collection apparatus 53, and a voice collection apparatus 54.

The storage apparatus 52 is configured to store one or more programs. The video image collection apparatus 53 is configured to collect a video or image data of a road and videos or image data of the outside personnel. The voice collection apparatus 54 is configured to collect voice data of the outside personnel. The one or more programs, when executed by the one or more processors, cause the one or more processors to implement the method for an unmanned vehicle passing through an intersection provided by Embodiment 1 of the present application or the method for an unmanned vehicle passing through an intersection provided by Embodiment 2 of the present application.

Related illustration can be understood by referring to the related descriptions and effects corresponding to the steps in FIG. 1 to FIG. 2, which will not be described herein again.

Embodiment 6

The embodiment of the present application further provides a computer readable storage medium having a computer program stored thereon, where the program is executed by a processor to implement the method for an unmanned vehicle passing through an intersection provided by Embodiment 1 of the present application or the method for an unmanned vehicle passing through an intersection provided by Embodiment 2 of the present application.

The computer readable storage medium provided by the embodiment detects whether the unmanned vehicle is at an intersection without a traffic light sign; identifies a moving direction and a distance or voice and limb reaction of the outside personnel when determining that the unmanned vehicle is at the intersection without the traffic light sign; determines whether to pass according to the moving direction and the distance or the voice and limb reaction of the outside personnel; and makes a corresponding voice prompt and/or a corresponding visual prompt to the outside personnel according to a result of the determination on whether to pass. Since the unmanned vehicle can obtain information from the outside personnel at the intersection without traffic lights, and make voice and/or visual prompts of giving way or going first for the outside personnel according to the information of the outside personnel, it can communicate with the outside personnel, thereby avoiding pedestrians, cyclists or other vehicles effectively and avoiding traffic accidents effectively.

In the several embodiments provided by the present application, it should be understood that the disclosed apparatus and method may be implemented in other manners. For example, the apparatus embodiments described above are merely illustrative. For example, the division of modules is only a logical function division. In an actual implementation, there may be another division manner. For example, multiple modules or components may be combined or integrated into another system, or some features can be ignored or not be executed. In addition, the mutual coupling or direct coupling or a communication connection shown or discussed may be indirect coupling or a communication connection through some interfaces, apparatuses or modules, and may be electrical, mechanical or in other forms.

The modules described as separate components may or may not be physically separate, and the components displayed as modules may or may not be physical modules, that is, they may be located in one place, or may be distributed to multiple network modules. Some or all of the modules may be selected according to actual needs to achieve the purpose of the solution of the embodiment.

In addition, each function module in each embodiment of the present application may be integrated into one processing module, each module may exist separately physically, or two or more modules may be integrated into one module. The above integrated modules may be implemented in the form of hardware or may be implemented in the form of hardware and software function modules.

Program codes for implementing the methods of the present application can be written in any combination of one or more programming languages. Those program codes can be provided to a processor or a controller of a general purpose computer, a special purpose computer or other programmable data processing apparatuses, so that when the program codes are executed by the processor or the controller, the functions/operations specified in the flowcharts and/or block diagrams are implemented. The program codes can be executed entirely on a machine, executed partly on the machine, and executed, as separate software package, partly on the machine and partly on a remote machine or executed entirely on the remote machine or a server.

In the context of the present application, a machine readable medium can be a tangible medium that can contain or store a program for being used by or used in combination with an instruction execution system, an apparatus or a device. The machine readable medium can be a machine-readable signal medium or a machine-readable storage medium. The machine-readable medium can include, but is not limited to, an electronic, a magnetic, an optical, an electromagnetic, an infrared, or a semiconductor system, apparatus, or device, or any suitable combination of the foregoing. More specific examples of machine-readable medium will include an electrical connection based on one or more wires, a portable computer disk, a hard disk, a random access memory (RAM), a read only memory (ROM), an erasable programmable read only memory (EPROM or a flash memory), optical fibers, a compact disk read only memory (CD-ROM), an optical storage device, a magnetic storage device, or any suitable combination of the foregoing.

In addition, although the operations are depicted in a particular order, it should be understood that such operations are required to be performed in the particular order illustrated or in a sequential order, or all illustrated operations are required to be performed to achieve desired results. Multitasking and parallel processing can be advantageous in certain situations. Likewise, although several specific implementation details are included in the above discussion, those details should not be understood as limiting the scope of the disclosure. Various features described in the context of separate embodiments can also be implemented in combination in a single implementation. On the contrary, various features described in the context of a single implementation can also be implemented in a plurality of implementations either individually or in any suitable sub-combination.

Although the subject matter has been described in language specific to structural features and/or methodological actions, it can be understood that the subject matter defined in the appended claims is not necessarily limited to the specific features and actions described above. On the contrary, the specific features and actions described above are only exemplary forms for implementing the claims.

What is claimed is:

1. A method for an unmanned vehicle passing through an intersection, applied to an in-vehicle terminal device that is set on the unmanned vehicle, the method comprising:
    obtaining, through a first outward-facing camera, a video or image data of a road, and detecting whether the unmanned vehicle is at an intersection without a traffic light sign according to the video or the image data of the road;
    obtaining, through a plurality of second outward-facing cameras, videos or image data of outside personnel, and identifying a moving direction and a distance of the outside personnel according to the videos or the image data of the outside personnel when determining that the unmanned vehicle is at the intersection without the traffic light sign;
    determining whether to pass according to the moving direction and the distance of the outside personnel; and
    making, through a microphone, a corresponding voice prompt to the outside personnel and/or making, through an outward-facing display screen and/or a light on a body of the unmanned vehicle, a corresponding visual prompt to the outside personnel according to a result of the determination on whether to pass;
    wherein the determining whether to pass according to the moving direction and the distance of the outside personnel comprises:
    determining to pass when the moving direction of the outside personnel is the same as that of the unmanned vehicle and the distance is within a preset safety distance; and
    determining not to pass when the moving direction of the outside personnel is different from that of the unmanned vehicle and the distance is within a preset dangerous distance.

2. The method according to claim 1, wherein the making, through the microphone, a corresponding voice prompt to the outside personnel and/or making, through an outward-facing display screen and/or a light on a body of the unmanned vehicle, a corresponding visual prompt to the outside personnel according to a result on the determination on whether to pass comprises:
    making, through the microphone, a voice prompt of giving way to the outside personnel, and/or displaying an animation or a text of giving way on the outward-facing display screen and/or lighting up a light of giving way on the body of the unmanned vehicle when the result of the determination on whether to pass is to pass; and making a voice prompt of going first for the outside personnel through the microphone, and/or displaying an animation or a text of going first on the outward-facing display screen, and/or lighting up a light of going first on the body of the unmanned vehicle when the result of the determination on whether to pass is not to pass.

3. The method according to claim 2, wherein the outward-facing display screen is disposed on a window glass; and the method further comprises:

controlling the window glass to become the outward-facing display screen when the unmanned vehicle interacts with the outside personnel through the outward-facing display screen; and controlling the window glass to show an outside panoramic view when the unmanned vehicle does not interact with the outside personnel.

4. The method according to claim 1, further comprising: identifying voice of the outside personnel and limb reaction of the outside personnel when determining that the unmanned vehicle is at the intersection without the traffic light sign;

wherein the determining to pass when the moving direction of the outside personnel is the same as that of the unmanned vehicle and the distance is within a preset safety distance comprises: determining to pass when the moving direction of the outside personnel is the same as that of the unmanned vehicle and the distance is within a preset safety distance, and when the voice and limb reaction of the outside personnel is reaction indicating that the outside personnel gives way; and the determining not to pass when the moving direction of the outside personnel is different from that of the unmanned vehicle and the distance is within a preset dangerous distance comprises: determining not to pass when the moving direction of the outside personnel is different from that of the unmanned vehicle and the distance is within a preset dangerous distance, and when the voice and limb reaction of the outside personnel is reaction indicating that the outside personnel goes first.

5. The method according to claim 2, wherein after the making, through the microphone, a voice prompt of giving way to the outside personnel and/or displaying an animation or a text of giving way on the outward-facing display screen and/or lighting up a light of giving way on the body of the unmanned vehicle, the method further comprises:

controlling the unmanned vehicle to brake urgently when identifying that there is the outside personnel turning at a front position of the unmanned vehicle during the unmanned vehicle passing; and making, through the microphone, the voice prompt of going first for the outside personnel and/or displaying the animation or the text of going first on the outward-facing display screen and/or lighting up the light of going first on the body of the unmanned vehicle.

6. The method according to claim 1, wherein the outside personnel is a pedestrian, a cyclist or a driver of other vehicle.

7. The method according to claim 4, wherein the identifying voice and limb reaction of the outside personnel comprises:

identifying limb reaction of the outside personnel according to the videos or image data of the outside personnel;

obtaining voice data of the outside personnel collected by a voice sensor; and identifying voice reaction of the outside personnel according to the voice data and the videos or image data of the outside personnel.

8. The method according to claim 1, wherein the determining whether to pass according to the moving direction and the distance of the outside personnel further comprises:

determining not to pass until the distance reaches the preset safety distance, when the moving direction of the outside personnel is the same as that of the unmanned vehicle and the distance is within a preset dangerous distance;

determining to slow down and pass in a case that the unmanned vehicle is capable of passing safely, when the moving direction of the outside personnel is different from that of the unmanned vehicle and the distance is within the preset safety distance.

9. An apparatus for an unmanned vehicle passing through an intersection, comprising: a processor and a computer-readable medium for storing program codes, which, when executed by the processor, cause the processor to:

obtain, through a first outward-facing camera, a video or image data of a road, and detect whether the unmanned vehicle is at an intersection without a traffic light sign according to the video or the image data of the road;

obtain, through a plurality of second outward-facing cameras, videos or image data of outside personnel, and identify a moving direction and a distance of the outside personnel according to the videos or the image data of the outside personnel when it is determined that the unmanned vehicle is at the intersection without the traffic light sign;

determine whether to pass according to the moving direction and the distance of the outside personnel; and make, through a microphone, a corresponding voice prompt to the outside personnel and/or making, through an outward-facing display screen and/or a light on a body of the unmanned vehicle, a corresponding visual prompt to the outside personnel according to a result of the determination on whether to pass;

wherein the program codes further cause the processor to:

determine to pass when the moving direction of the outside personnel is the same as that of the unmanned vehicle and the distance is within a preset safety distance; and determine not to pass when the moving direction of the outside personnel is different from that of the unmanned vehicle and the distance is within a preset dangerous distance.

10. The apparatus according to claim 9, wherein the program codes further cause the processor to:

make a voice prompt of giving way, to the outside personnel through the microphone, and/or display an animation or a text of giving way on the outward-facing display screen, and/or light up a light of giving way on the body of the unmanned vehicle, when the result of the determination on whether to pass is to pass; and make a voice prompt of going first to the outside personnel, and/or display an animation or a text of going first on the outward-facing display screen, and/or light up a light of going first on the body of the unmanned vehicle, when the result of the determination on whether to pass is not to pass.

11. The apparatus according to claim 10, wherein the outward-facing display screen is disposed on a window glass;

the program codes further cause the processor to control the window glass to become the outward-facing display screen when the unmanned vehicle interacts with the outside personnel through the outward-facing display screen; and control the window glass to show an outside panoramic view when the unmanned vehicle does not interact with the outside personnel.

12. The apparatus according to claim 10, the program codes further cause the processor to:
control the unmanned vehicle to brake urgently when identifying there is the outside personnel turning at a front position of the unmanned vehicle during the unmanned vehicle passing through;
make, through the microphone, a voice prompt of going first to the outside personnel and/or display an animation or a text of going first on an outward-facing display screen and/or light up a light of going first on the body of the unmanned vehicle.

13. The apparatus according claim 9, wherein the outside personnel is a pedestrian, a cyclist or a driver in another vehicle.

14. The apparatus according to claim 9, wherein the program codes further cause the processor to:
identify voice of the outside personnel and limb reaction of the outside personnel when it is determined that the unmanned vehicle is at the intersection without the traffic light sign;
wherein the program codes further cause the processor to:
determine to pass when the moving direction of the outside personnel is the same as that of the unmanned vehicle and the distance is within a preset safety distance, and when the voice and limb reaction of the outside personnel is reaction indicating that the outside personnel gives way; and
determine not to pass when the moving direction of the outside personnel is different from that of the unmanned vehicle and the distance is within a preset dangerous distance, and when the voice and limb reaction of the outside personnel is reaction indicating that the outside personnel goes first.

15. The apparatus according to claim 14, wherein the program codes further cause the processor to:
identify limb reaction of the outside personnel according to the videos or the image data of the outside personnel;
obtain voice data of the outside personnel collected by a voice sensor; and identify voice reaction of the outside personnel according to the voice data and the videos or image data of the outside personnel.

16. The apparatus according to claim 9, wherein the program codes further cause the processor to:
determine not to pass until the distance reaches the preset safety distance, when the moving direction of the outside personnel is the same as that of the unmanned vehicle and the distance is within a preset dangerous distance;
determine to slow down and pass in a case that the unmanned vehicle is capable of passing safely, when the moving direction of the outside personnel is different from that of the unmanned vehicle and the distance is within the preset safety distance.

17. An in-vehicle terminal device, wherein the in-vehicle terminal device is disposed on an unmanned vehicle and comprises:
one or more processors;
a storage apparatus, configured to store one or more programs;
a video image collection apparatus, configured to collect a video or image data of a road and videos or image data of the outside personnel;
a voice collection apparatus, configured to collect voice data of the outside personnel;
wherein the one or more programs, when executed by the one or more processors, cause the one or more processors to implement the steps of:
obtaining, through the video image collection apparatus, a video or image data of a road, and detecting whether the unmanned vehicle is at an intersection without a traffic light sign according to the video or the image data of the road;
obtaining, through the video image collection apparatus, videos or image data of the outside personnel, identifying a moving direction and a distance of outside personnel according to the videos or the image data of the outside personnel when determining that the unmanned vehicle is at the intersection without the traffic light sign;
determining whether to pass according to the moving direction and the distance of the outside personnel; and
making, through a microphone, a corresponding voice prompt to the outside personnel and/or a making, through an outward-facing display screen and/or a light on a body of the unmanned vehicle, corresponding visual prompt to the outside personnel according to a result of the determination on whether to pass;
wherein the determining whether to pass according to the moving direction and the distance of the outside personnel comprises:
determining to pass when the moving direction of the outside personnel is the same as that of the unmanned vehicle and the distance is within a preset safety distance; and
determining not to pass when the moving direction of the outside personnel is different from that of the unmanned vehicle and the distance is within a preset dangerous distance.

18. A non-transitory computer readable storage medium having a computer program stored thereon, wherein the program is executed by a processor to implement the steps of:
obtaining, through a first outward-facing camera, a video or image data of a road, and detecting whether the unmanned vehicle is at an intersection without a traffic light sign according to the video or the image data of the road;
obtaining, through a plurality of second outward-facing cameras, videos or image data of the outside personnel, and identifying a moving direction and a distance of outside personnel according to the videos or the image data of the outside personnel when determining that the unmanned vehicle is at the intersection without the traffic light sign;
determining whether to pass according to the moving direction and the distance of the outside personnel; and
making, through a microphone, a corresponding voice prompt to the outside personnel and/or making, through an outward-facing display screen and/or a light on a body of the unmanned vehicle, a corresponding visual prompt to the outside personnel according to a result of the determination on whether to pass;
wherein the determining whether to pass according to the moving direction and the distance of the outside personnel comprises:

determining to pass when the moving direction of the outside personnel is the same as that of the unmanned vehicle and the distance is within a preset safety distance; and determining not to pass when the moving direction of the outside personnel is different from that of the unmanned vehicle and the distance is within a preset dangerous distance.

\* \* \* \* \*